Patented Jan. 3, 1933

1,893,249

UNITED STATES PATENT OFFICE

PAUL SCHETELIG, OF BASEL, AND THEODOR SUTTER, OF MONTHEY, SWITZERLAND, ASSIGNORS TO THE FIRM OF SOCIETY OF CHEMICAL INDUSTRY IN BASLE, OF BASEL, SWITZERLAND

PROCESS OF MAKING ACETYLENE CONDENSATION PRODUCTS

No Drawing. Application filed June 4, 1928, Serial No. 282,886, and in Switzerland June 16, 1927.

The present invention relates to the manufacture of new condensation products of acetylene. It comprises the process of making these products, as well as the new products themselves.

The invention consists in the manufacture of new condensation products by treating an aromatic primary amino-compound, such as aniline, toluidine, naphthylamine, and the substitution products thereof, with acetylene in presence of a catalyst. Particularly metal compounds may be used as such catalysts, and among these the mercuric compounds, such as the mercuric and mercurous salts, are especially suitable.

The products are applicable for many purposes; for instance in making lacquers and varnishes which are stable to alkali; they are also useful as assistants to vulcanization or as anti-agers in the rubber industry and still for other purposes. They can also be converted into technically valuable new compounds by sulfonation, nitrosation, nitration, reduction and like treatment, or by treatment with an aldehyde, such as formaldehyde or acetaldehyde. The products treated with aldehydes may be still more valuable than those not so treated, particularly in the rubber industry.

The following examples illustrate the invention, the parts being by weight:—

Example 1

280 parts of aniline are stirred with 27 parts of mercuric chloride in an atmosphere of acetylene at 30–50° C. until no more acetylene is absorbed. The reddish reaction product is dissolved in dilute mineral acid, the solution is filtered from mercury mud, and the unchanged aniline is expelled from the solution made alkaline by means of steam; the final reaction product remains as a reddish resin, melting between 70° and 104° C. It is insoluble in water but easily soluble in dilute acids and organic solvents.

Analysis shows that the new product contains nitrogen, and that about 1½ molecular proportions of actylene have combined with one molecular proportion of aniline. When treating the new product with nitrous acid the latter is taken up but the resulting product is no diazo-compound.

Example 2

90 parts of aniline, 200 parts of benzene and 9 parts of mercuric chloride are caused to react with acetylene in the manner described in Example 1. The mass produced is acidified with dilute acid. The benzene is expelled by means of steam, the acid solution is filtered from mercury mud and unchanged aniline is expelled from the solution made alkaline by means of steam. The residue is identical with that obtained as described in Example 1.

If other primary aromatic amines, such for example as α-naphthylamine or o-toluidine, are substituted for aniline similar products are obtained. Instead of mercuric chloride also mercuric acetate may be employed.

Example 3

186 parts of aniline, 65 parts of aniline hydrochloride and 10 parts of mercuric oxide are stirred together in an atmosphere of acetylene at 80–90° C. The product is worked up as described in Example 1 and is the same as that obtained in the said example.

Example 4

A mixture of 200 parts of benzene and 90 parts of aniline is saturated with dry hydrochloric acid gas and the excess of the latter is separated by means of a current of dry air; after addition of 9 parts of mercuric chloride the mixture is stirred in an atmosphere of acetylene at 30–50° C. The whole is taken up in water, some hydrochloric acid is added and the benzene is separated; the solution is then filtered from mercury mud and further treated as described in Example 1. The product is identical with that obtained in the preceding examples.

Example 5

Into a mixture consisting of 90 parts of aniline and 45 parts of chlorobenzene, acetylene is conducted at 40–50° C., while stirring vigorously and gradually adding 15 parts of mercuric chloride, until acetylene is no longer absorbed. To the whole there are then added 200 parts of chlorobenzene, and caustic soda solution is added in drops until the reaction is feebly alkaline. The mixture is allowed to settle and the resulting two layers are separated. The chlorobenzene layer is then freed from chlorobenzene and aniline still present by heating in a vacuum, it having been found expedient to expel towards the end of the operation the last portions of aniline by passing steam into the mass. The remaining resin is similar to the product obtained in Example 1.

The working up of the reaction mass may also be carried out in such a manner that some formaldehyde solution is added to the mass, followed by heating, after the absorption of acetylene has ceased. By this procedure a complete separation of the mercury is attained and at the same time a much harder resin is obtained. This treatment may also be carried out with the products obtained by means of other bases.

The products treated with formaldehyde are further distinguished from the starting materials by their insolubility in dilute acids.

What we claim is:—

1. The preparation of new condensation products, consisting in treating aromatic primary amines with acetylene in presence of mercuric chloride as catalyst and in the absence of water, and then treating the condensation products thus obtained with an aldehyde.

2. The preparation of new condensation products, consisting in treating aromatic primary amines of the naphthalene series with acetylene in presence of mercuric chloride as catalyst and in the absence of water, and then treating the condensation products thus obtained with an aldehyde.

In witness whereof we have hereunto signed our names this 24th day of May 1928.

PAUL SCHETELIG.
THEODOR SUTTER.